Patented Feb. 23, 1932

1,846,880

UNITED STATES PATENT OFFICE

WALTER KUSSMAUL, OF BASEL, SWITZERLAND, ASSIGNOR TO CHEMICAL WORKS FORMERLY SANDOZ, OF BASEL, SWITZERLAND

ALUMINUM SALTS OF GLUCONIC ACID

No Drawing. Application filed January 31, 1930, Serial No. 425,060, and in Germany February 15, 1929.

The present invention relates to the preparation of aluminum salts of gluconic acid which have hitherto never been prepared and which possess very valuable properties.

Some of the aluminum compounds used in the therapy are not stable enough in aqueous solution or are not obtainable in a solid form without partial loss of the primordial solubility, as for instance in the case of aluminum acetate. It has often been tried to overcome these difficulties by suitable additions which are broadly described in the literature (Ullmann, Enzyklopädie der Technischen Chemie, Tome V, page 12).

It has now been found that the hitherto unknown non-hygroscopic aluminum salts of gluconic acid form stable solutions and conserve even after drying the property of a perfect solubility in water yielding clear and stable solutions.

These solutions possess an acid reaction which may be neutralized without any precipitation occurring. Even when made alkaline with ammonia, they remain perfectly clear, the aluminum compounds being not hydrolyzed. They also may be heated for a long time without becoming gelatinous like the solutions of aluminum acetate. These properties show the difference between the hitherto unknown aluminum compounds of gluconic acid and most of the aluminum salts generally used for pharmaceutical purposes.

The new aluminum derivatives of gluconic acid are preferably prepared by double decomposition of suitable aluminum salts, for example aluminum sulphate, with gluconic acid salts, for instance barium gluconate, eventually in presence of hydroxides of earth alkali metals. The precipitate of the earth alkali metal sulphate is first separated and the remaining solution of aluminum gluconate evaporated to dryness or precipitated by means of alcohol.

Neutral aluminum compounds of gluconic acid may be prepared by treating an aqueous alkali aluminate solution with gluconic acid or by neutralizing the above described aluminum gluconate by a suitable quantity of an alkali.

The new aluminum compounds may be advantageously employed for pharmaceutical and other chemical purposes.

The following examples illustrate the invention.

Example 1

To 1 molecule of aluminum sulphate dissolved in hot water a warm saturated solution of 3 molecules of calcium gluconate is added. By further boiling the precipitation of calcium sulphate is completed and then the filtered solution is evaporated preferably in vacuo. The resulting dry product forms in pulverized state a white powder easily soluble in water, yielding stable solutions. It possesses probably the following formula $Al(C_6H_{11}O_7)_3$ and contains 4.42% Al.

Example 2

6,6 parts of crystallized aluminum sulphate dissolved in hot water are treated with a saturated hot aqueous solution of 5,7 parts of barium gluconate and thereupon a saturated solution of 7 parts of crystallized barium hydroxide is further added. After separation of the obtained barium sulphate the solution is concentrated in vacuo and the aluminum compound precipitated by means of methyl alcohol in form of a white powder, which is, when dried, easily soluble in water, yielding stable solutions and containing 11,9 per cent of aluminum. Its probable formula is the following:

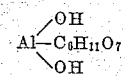

Example 3

To a hot saturated solution of commercial sodium aluminate there is added an 80 per cent aqueous solution of free gluconic acid until the strong alkaline reaction has disappeared and the solution reacts slightly acid. The clear solution thus obtained is treated with methyl alcohol and the precipitated compound filtered, washed with methyl alcohol and dried. In dry state it constitutes a white voluminous powder which contains 7,2 per cent aluminum and 6,8 per cent sodium. It possesses the probable formula:

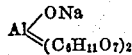

What I claim is:

The aluminum salts of gluconic acid, which can be obtained by the interaction of aluminum salts with gluconic acid and its salts and which are in the dry state non-hygroscopic white powders, easily soluble in water with a slight acid reaction, yielding stable solutions which can be neutralized with alkali and even be made alkaline with ammonia without any precipitation occurring.

In witness whereof I have hereunto signed my name this 20th day of January, 1930.

WALTER KUSSMAUL.